May 17, 1955

F. M. ALEXANDER ET AL 2,708,730

ELECTRIC MOTOR FOLLOW-UP SYSTEM
WITH MOVABLE CORE TRANSFORMER

Filed Feb. 16, 1951

INVENTORS
FRANK M. ALEXANDER
AND ANTHONY J. HORNFECK
BY
Raymond D. Junkins
ATTORNEY

United States Patent Office 2,708,730
Patented May 17, 1955

2,708,730

ELECTRIC MOTOR FOLLOW-UP SYSTEM WITH MOVABLE CORE TRANSFORMER

Frank M. Alexander, Euclid, and Anthony J. Hornfeck, Lyndhurst, Ohio, assignors to Bailey Meter Company, a corporation of Delaware Application February 16, 1951, Serial No. 211,414

7 Claims. (Cl. 318—28)

Our invention is related to an improvement in electric circuits and, more particularly, to those balanceable electric networks in which the balance condition is difficult to obtain, and maintain, because of the presence of unbalanced components of the voltages, or currents, sought to be balanced.

The movable core transformer, forming the subject matter of at least the patent to Hornfeck No. 2,564,221, is now established as a familiar device in electric telemetering circuits. In its simpler form and function its core is positioned by a variable so as to vary the electromagnetic coupling of a primary coil to one or more secondaries. The potential so established in the secondaries is then compared with another potential and any difference applied to a circuit controlling a motor to vary the comparison potential until it balances that of the movable core transformer. Should the potential output of the movable core transformer secondaries contain a component which is not properly balanced with a component of the comparison potential, there will remain a potential between the two after their resultants have been reduced toward equality by the balancing action.

These residual potentials in balanceable networks have long plagued workers in this art for their effect is to saturate the device sensitive to the phase and magnitude of the potential differences with unwanted potentials and paralyze its response to the basic potential difference signal. Prior to our invention, the results of this undesirable condition has been a troublesome lack of sensitivity in the device responsive to the basic signal and consequently a reduction in effective control of the balancing motor. Our invention generally alleviates this condition.

There are balanceable networks, of which the simple resistance Wheatstone bridge is an example, wherein the commercial frequency of 60 cycles does not result in a prohibitively large residual unbalance on the phase-sensitive, motor-control network. In these networks the over-all response is satisfactory for the particular variable measured or controlled. It is our invention which permits sensitive response to be obtained in balanceable circuits which have given unsatisfactory operation previously because of the undesirable components.

In circuits using the movable core transformer with frequencies greater than 60 cycles, the unbalanceable components of the transmitter and receiver have become increasingly larger with frequency because of such factors as capacity coupling and eddy currents in the core structure. The advantages of the balancing schemes of our invention become positively important at the higher frequencies and make systems operable which before were impractical because of poor response.

As the problem which our invention solves is associated with networks employing movable core transformers, we will explain its function in application to two types of circuits we regard as fundamental. In the first of these circuits is a movable core transformer, as a transmitter, whose secondary potential is compared to that of a receiver secondary potential by an amplifier-motor control network which actuates a motor for adjusting the receiver potential until the differential is reduced. The second circuit employs an energized potentiometer as a balancing means. Many different forms of these fundamental circuits are made for the performance of a myriad of functions, and our invention is applicable to all of them as we will explain in connection with these two fundamental forms.

Therefore, as an initial objective of our invention we have an improvement in the response of electric telemetering networks generally.

Another objective is the reduction of undesirable characteristics in the voltages of electric telemetering networks.

Another objective is compensation of undesirable characteristics of one unit of an electric telemetering network by the use of similar characteristics of another unit of the network.

Another objective is the introduction of characteristics into the output of a unit of an electric telemetering network for the compensation of undesirable characteristics in the output of another unit of the network.

Another objective is the alteration of the phase of a secondary voltage within a movable core transformer with substantially no disturbance of the core position-voltage magnitude relationship.

Another objective is the alteration of the phase of one secondary voltage of a movable core transformer relative to the phase of the secondary voltage of another movable core transformer in an electric telemetering circuit that particular components in each voltage output will match and compensate one another.

Figure 1:
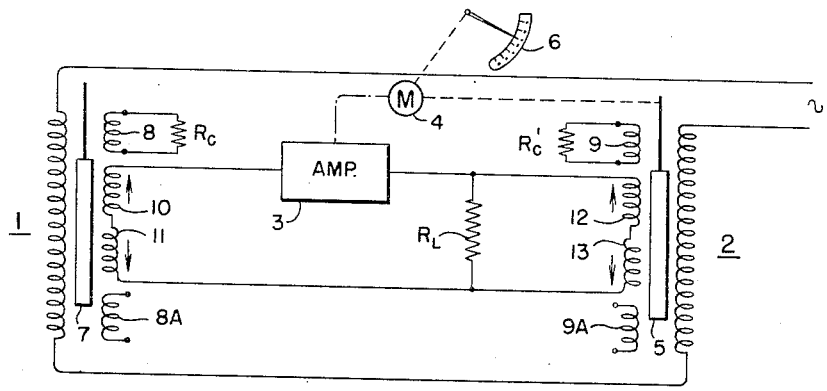
Fig. 1 is a balanceable network including two movable core transformers and utilizing a portion of our invention.

The physical appearance of the movable core transformer is familiar to everyone skilled in this art. More than a diagrammatic representation of the device is deemed unnecessary and Fig. 1 illustrates the first, basic, transformer-transformer network adequately enough to show a portion of our invention in association therewith. Movable core transformer 1 establishes, and transmits, a potential signal which is received, and balanced, by a movable core transformer 2. Amplifier-motor control 3 may take the well-known form described in at least patents to Ryder 2,275,317 and 2,333,393 and Hornfeck 2,437,603. The motor 4 is reversible and under control of 3 for moving core 5 of movable core transformer 2 to a balance position and simultaneously indicating the movement as a change in the value of the variable on chart 6.

All of this cooperation of elements to telemeter a variable of core 1 and 2 is well known, from the initial motion of core 7 at the transmitter 1 to the final indication and recordation upon chart 6. It is the precise phase relation between the secondary voltages with which we are immediately concerned. The voltages have a characteristic inherent with the movable core transformers that produce them and it is our objective to correct their phase relations for better control of motor 4.

Figure 2:
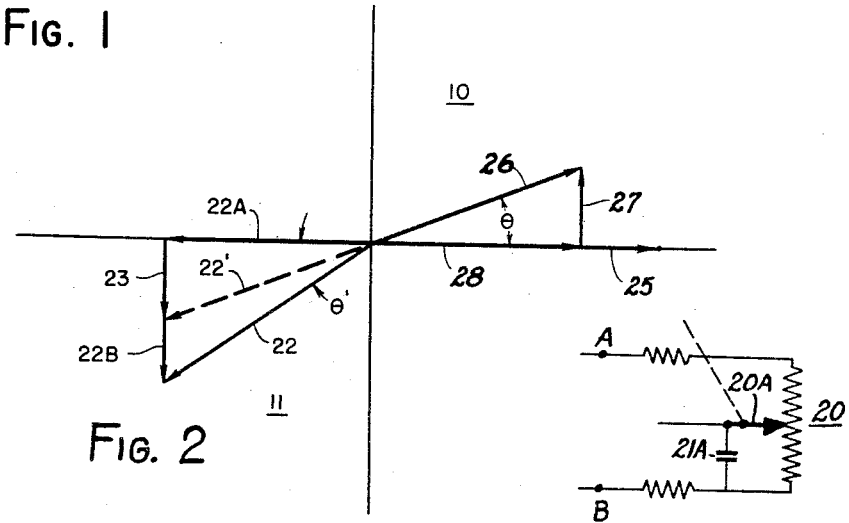
Fig. 2 is a vector analysis of the voltage relations between the outputs of the transformers of Fig. 1.

With secondaries 10 and 11 connected in bucking relation, their total voltage, as an output, will be a minimum when the core 7 is mid-way between them. This total voltage will be zero only if the two secondary voltages are equal in magnitude and phase. Movement of this core 7 toward one secondary or the other will cause its voltage to dominate the total output from both secondaries and depend in magnitude upon the extent of departure from the zero position. Whatever phase or magnitude the two secondary voltages attain, their resultants must be considered in their components as we vectorially represent them in Fig. 2. As a reference for the analysis, vector 25 is given to represent the voltage of the supply to the transformer network.

The resultant voltage of secondary 10 is depicted as vector 26 with a component 28 in phase with reference 25 and an out-of-phase component 27. The resultant voltage of secondary 11 is depicted as vector 22 with a component 22A in phase with reference 25 but opposite in sign to both 25 and the component 28. It is possible to physically dimension the secondary windings and associated structures 10 and 11 so that the magnitude of the resultant 26 will substantially equal the resultant 22 when an equal amount of core 7 couples them to the primary. However, the phase angle θ between voltage 26 and reference 25 will be different from the phase angle θ' between voltage 22 and the opposite sign of reference 25 due to a difference in magnitude of out-of-phase components 27 and 22B. This difference between magnitudes results from distortion in flux linkage between the primary and the two secondaries, produced primarily by unbalance in leakage flux paths through surrounding material and resulting eddy currents.

It should now be obvious that in any of these commercially available transformers the secondary voltages of the windings can never be equalized to give a total output of zero from a bucking connection but will approach equality only by the minimum value of the difference between the out-of-phase components we have represented by vector 23.

Having analyzed the secondary voltages, individually and vectorially in this manner, it becomes apparent that if we load the winding having the larger out-of-phase component when the core is at center position until the out-of-phase components are equal, the phases of the windings will be more nearly maintained equal throughout the stroke of the coupling core. This shift in the phase of the proper secondary voltage can be quickly made as we know what differential is significant and in what direction to correct. Resultant 22 becomes 22' and the new result is an output voltage from the secondary structure of the movable core transformer which will reduce to zero at mid-core position.

The confusion which has existed heretofore in circuits balancing the voltages of movable core transformers is now apparent. In the circuits of Fig. 1, heretofore, the voltages of movable core transformer 1 and movable core transformer 2, in their application to 3, each contained the components which did not match, or balance, in any particular. With variation to some extent, from transformer to transformer between these out-of-phase components, despite the substantial equality of physical dimensions between the windings of each transformer it is only the more amazing that balance between any two transformers similar to 1 and 2 has been obtained as closely as has been done. Generally, residual unbalances, due to the difference in out-of-phase component magnitude, below 50 millivolts have not been considered as preventing a fairly practical speed of response in these circuits. However, the use of frequencies higher than 60 cycles has caused residual unbalances to quickly exceed even this generous limit.

We have arbitrarily associated $R_c$ and $R_c'$ with the upper set of secondaries on each movable core transformer in illustrating how to bring about the desired phase shift in the voltages of these secondary sets. $R_c$ and $R_c'$ are resistances and are referred to as shunted across their respective windings. The windings actually shunted by $R_c$ and $R_c'$ are designated on each movable core transformer as 8 or 8A and 9 or 9A; they are symmetrically placed on each side of the mid-position of the cores for the basic maintenance of the electromagnetic balance of the entire structure. Their distance from the mid-position of the core has not appeared to be particularly critical as long as symmetry is maintained. Then with $R_c$ either on 8 or 8A and $R_c'$ either on 9 or 9A in accordance with our analysis, the differential between the out-of-phase components of the winding sets on each side of the mid-position of the cores can be reduced in magnitude without appreciable loading down of the total movable core transformer output. Or, the voltage magnitude output of the transformer versus core position, as a relation, remains relatively undisturbed by the loading contributed by $R_c$ which shifts the phase of the voltage of its secondary set.

Once we discovered the technique of internally balancing the movable core transformers we were able to extend the procedure to adjustment of the phase relations between any two transformers utilized in a balancing network. The vector analysis of Fig. 2 remains useful for the similar analysis and $R_L$ in Fig. 1 represents the value of the resistance which is added, as a load, to the transformer having the larger out-of-phase component for the desired shift in matching it to that of the companion coil output. It must be kept in mind, however, that between two internally balanced transformers the greatest difference between the out-of-phase components of their secondary voltages occurs at the maximum distance their cores move from their center position. Therefore, cores 7 and 5 are moved to the end of their ranges in the same direction and $R_L$ sized across the output of the transformer with the larger out-of-phase component to equalize the phases of the resultants. With the correction made at such points in the core travels, the difference between the phases will be maintained fairly close to equality throughout their relations in assuming balance positions within their ranges.

Figure 3:
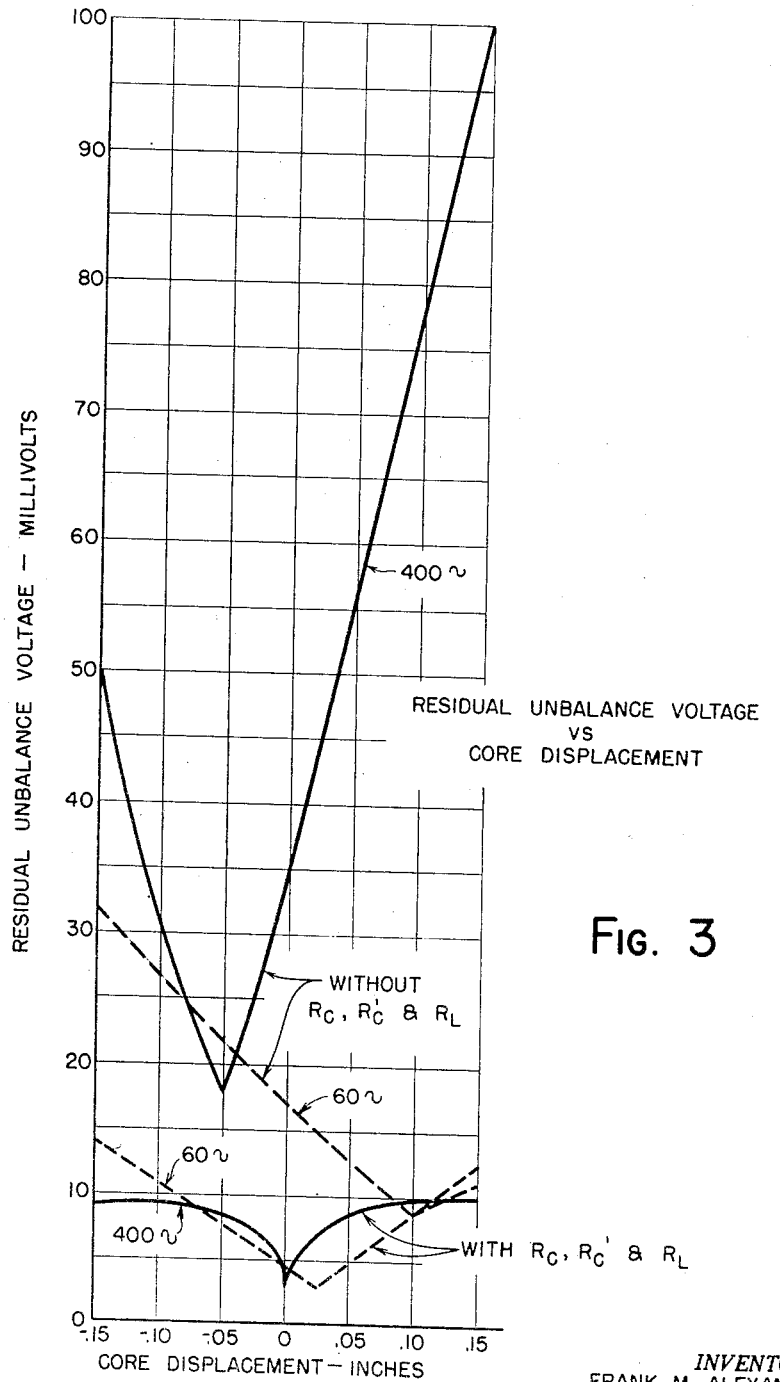
Fig. 3 is a comparative graph of the performance of the network of Fig. 1 with, and without, a portion of our invention.

The significant results of this structural addition to this fundamental circuit is shown in Fig. 3. To obtain these comparative results, it was only necessary to use the commercial movable core transformer available in the circuit of Fig. 1 and energize it with first the standard 60 cycle frequencies and then 400 cycles. This produced the upper pair of curves of Fig. 3. The transformers were then internally balanced and matched after the manner heretofore discussed and again energized with the two different frequencies over the core stroke as shown. The residual unbalance that remained applied to the amplifier-motor control circuit 3 was plotted as the ordinate against the core displacement over a predetermined range with the results shown on graphs of Fig. 3. The maximum residual unbalance voltage remaining on the amplifier-motor control at any time, utilizing this portion of our invention, was under 15 millivolts. Without the paralyzing voltage components prominent, sensitivity of the balancing motor gained in this network was quite a satisfactory advance over the prior practice.

Figure 4A:
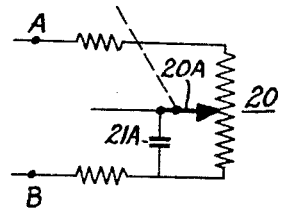
Fig. 4A shows a modification of Fig. 4.
Figure 4:
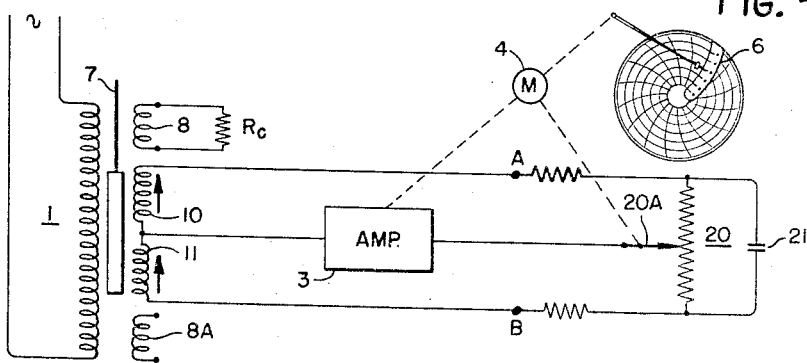
Fig. 4 is a balanceable network including a movable core transformer and a potentiometer and utilizing a portion of our invention.

Referring now to Fig. 4, the fundamental circuit we refer to as the transformer-resistance circuit may be seen. Here, movable core transformer 1 is internally balanced by the selective addition of $R_c$ to the secondary set having the larger out-of-phase component in its voltage output. In this circuit the ratio of the output voltage of secondary 10 to the output voltage of secondary 11 is compared to the ratio of the voltage from point A to brush 20A; to the voltage from brush 20A to point B. The output voltage of 11 varies in phase relation to output voltage of 10, with core movement. However, the phase of the voltage from A to brush 20A will not vary relative to the voltage from 20A to B. For these reasons the signal reaching the amplifier 3 can never reach zero, but will contain the out-of-phase component which we refer to as the residual voltage. Without our invention it was impossible for amplifier-motor control 3 to completely equalize the output of movable core transformer 1 with potentiometer 20 in view of either the internal unbalance of components within the transformer structure or, as here, the unbalance due to the out-of-phase component of movable core transformer 1 which has no equivalency in the voltage across potentiometer 20.

It was in such instance that we evolved the expediency of symmetrically establishing across potentiometer 20 a capacitor 21 which would add an out-of-phase component to the ratio of voltage drops across the potentiometer and which is substantially matched with the out-of-phase component in the ratio of voltage outputs of movable core transformer 1.

To maintain the required symmetry, it is obvious that the placement of capacitor 21 may necessarily have to be alternately incorporated in acordance with the arrangement and hook-up of the secondaries of transformer 1. In Fig. 4a we have shown the capacitor 21 in a position designated as 21A. Specifically then, capacitor 21 is defined into a position of full shunt across potentiometer 20 when it is desired to have the core moved equally across the balance point at mid-core position. When it is desired to establish a range which requires movement of the core from the mid-position in one direction only, the capacitor is placed as shown at 21A. Thus is illustrated the mechanical, obvious measures which fall well within the teachings of the required electrical symmetry needed in this type of balanceable network.

Figure 5:
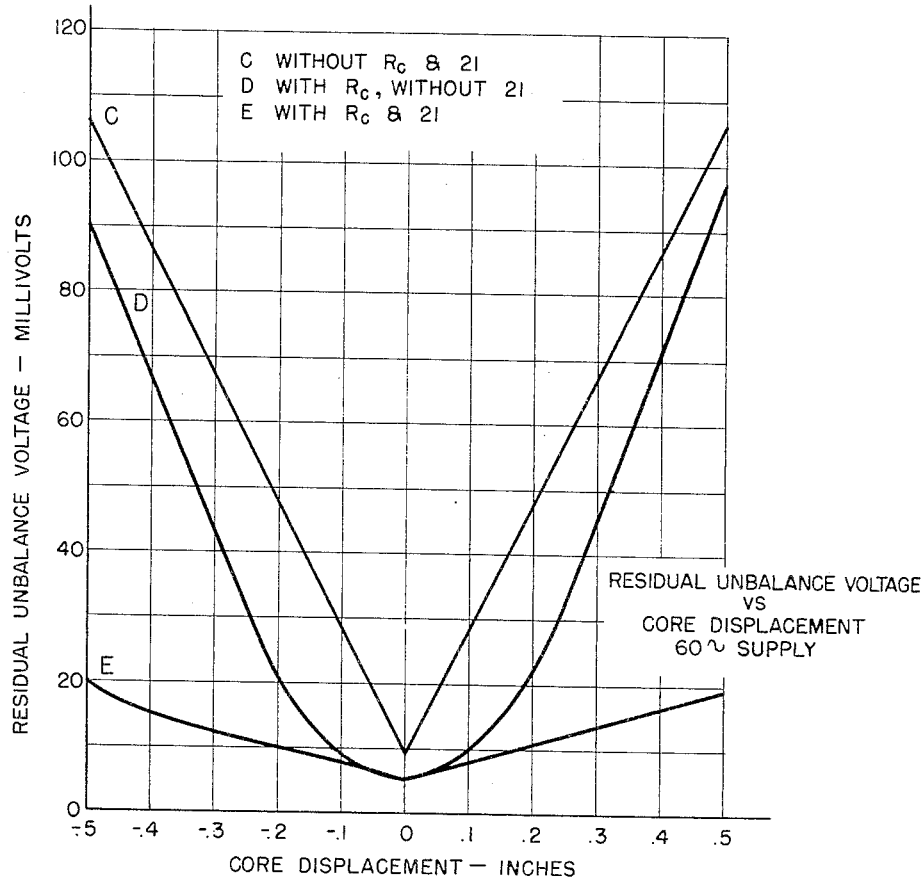
Fig. 5 is a comparative graph of the performance of the network of Fig. 4 with, and without, a portion of our invention.

Again the results of applying our inventive structure to the basic circuits can be clearly illustrated. Fig. 5 gives three comparative curves which illustrate the performance of the basic circuits shown in Fig. 4 with, and without, portions of our invention. With both internal balancing of core 1 and capacitor 21 across potentiometer 20, a core displacement of 1 inch results in no more than a 20 millivolt residual unbalance remaining on the amplifier 3 at any time. It is this basic circuit particularly which has long awaited structure such as now supplied by our invention. The undesirable phase relationship between the voltage output of a movable core transformer and that across a balancing potentiometer has restricted employment of this useful circuit from many telemetering applications.

We now disclose the final steps taken by us to improve the function of these fundamental circuits. It is well known that the outputs of movable core transformers contain higher harmonics of fundamental frequencies which become increasingly troublesome with employment of higher frequencies in the supply. In combination with the novel structure we have heretofore disclosed to shift the phase of the voltages across the circuit, we wish to disclose structure to isolate the amplifier-motor control circuit from these harmonic components.

Figure 6:
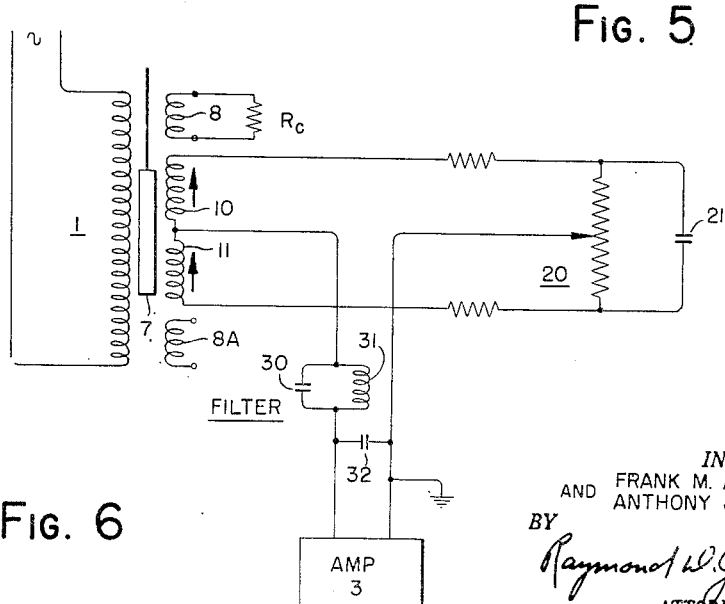
Fig. 6 is the balanceable network of Fig. 4 utilizing a portion of our invention.
Figure 7:
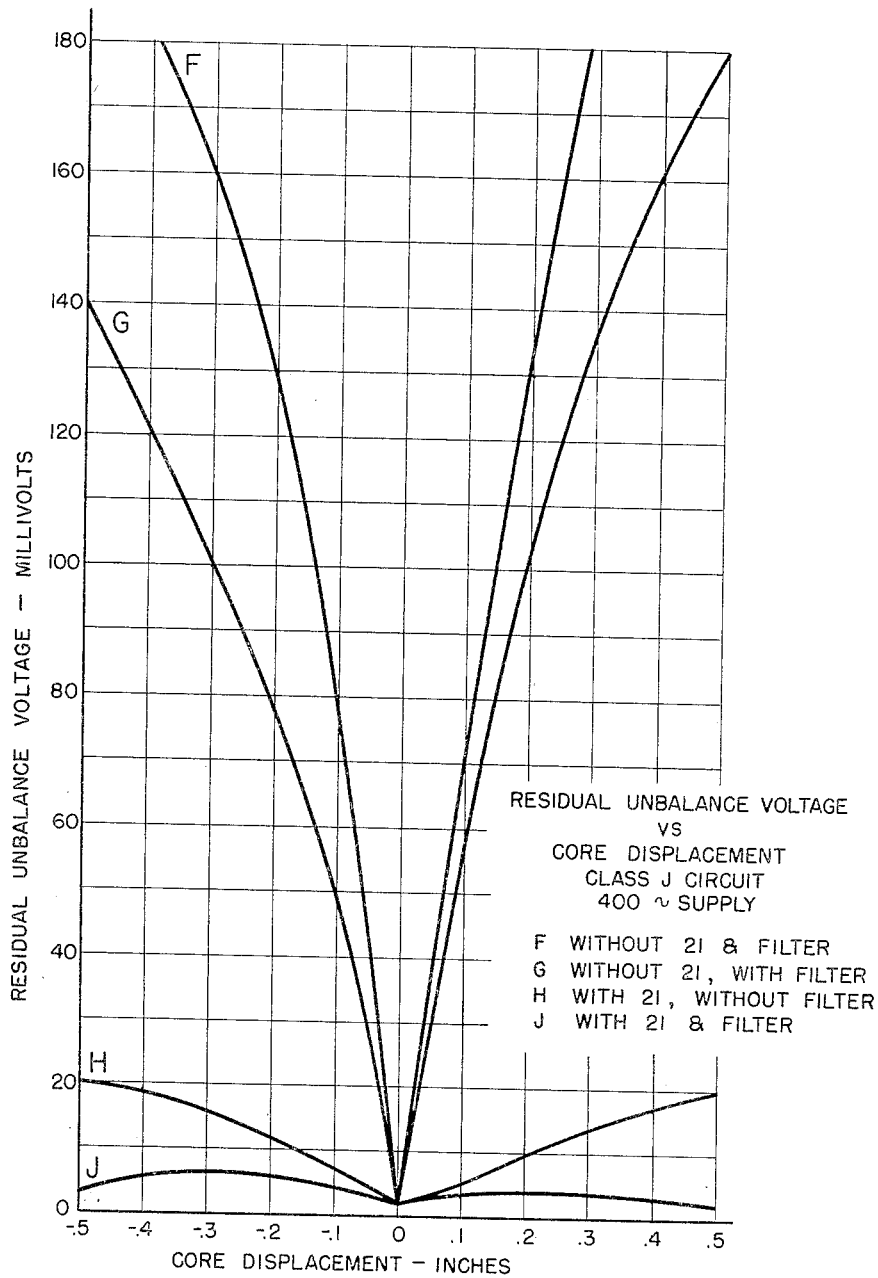
Fig. 7 is a comparative graph of the performance of the network of Fig. 6 with, and without, various combinations and units of our invention.

Fig. 6 shows the application of the harmonic-blocking structure to the basic circuit of Fig. 4. This choice between the fundamental circuits was made to illustrate this structure because the comparative results of Fig. 7 are available to demonstrate the effectiveness of the function. In Fig. 6 we have provided the combination of capacitor 30, inductance coil 31 and capacitor 32 as a filter circuit to provide relatively low impedance to any predetermined frequency of voltage and higher impedance to the components of higher frequency. By the filter, the harmonics are first attenuated in, and then shunted from, the input to the amplifier-motor control circuit 3.

Capacitor 30 and inductance coil 31 are first established in parallel in the ungrounded side of the amplifier input to block third harmonics. For these particular fundamental circuits the ungrounded side of the input was found the more desirable in attaining the desired end result. The inductance of coil 31 was then varied until its value and that of capacitor 30 balanced to provide the desired low impedance to the predetermined supply frequency, here taken to be 400 cycles. The higher harmonics of this frequency were attenuated for shunting through capacitor 32 for isolation from the amplifier circuit.

Fig. 7 offers the comparative data to show the reduction of the residual unbalance on the amplifier-motor control circuit in the fundamental circuits of Figs. 4 and 6. Curve J not only shows that an inch stroke in the core 7 does not at any time give a residual unbalance greater than 10 millivolts, but indicates that even larger strokes will not greatly increase the residual unbalance.

With our disclosed combination of structural units, we give notable improvement in the sensitivity and speed of response of telemetering circuits which employ devices, such as our movable core transformer, which would otherwise produce inconsistent magnitudes in the components of their output voltages. Although the preferred embodiments illustrated are relatively specific, we do not intend that we be limited in our inventive concepts by other than the scope of the following claims.

What we claim as new, and desire to secure by Letters Patent of the United States, is:

1. A balanceable electric network including, a movable core transformer whose secondary potential output has a determinable phase and magnitude in accordance with a variable range, a potentiometer establishing a balance potential, a common source of supply for the transformer and potentiometer, means under control of differences between the secondary potential and balance potential for adjusting the potentiometer toward equalization of the potentials, and means electrically shunting at least a portion of the potentiometer for giving the balance potential a phase which will vary at the same rate in relation to the supply from the point of equality with that of the secondary potential.

2. The network of claim 1 wherein the means associated with the potentiometer is a capacitor shunted symmetrically across the mid-point of the potentiometer range.

3. A balanceable electric network adapted for energization by high frequency potential including, a transmitter and receiver each energized by the high frequency potential and each having a plurality of potential producing structures for establishing transmitted and balancing potentials, means associated with the transmitter and receiver for equalizing the components of the potentials produced by the structures of each, means for equalizing the components of the transmitted and balancing potentials, a grounded conductor and an ungrounded conductor each connected to the transmitter and receiver and between which the network output appear as a potential, a capacitance and inductance paralleled in the ungrounded conductor of the network output and tuned to the high frequency, a capacitance shunted across the network output, and means responsive to the phase and magnitude of the output potential for adjusting the balancing potential to equal the transmitted potential.

4. A balanceable electric network including, a transformer having a primary energized by alternating current, a pair of secondaries and a core movable in response to a variable to change the ratio of coupling of the respective secondaries to said primary, a potentiometer connected for energization by said secondaries jointly and having a slider, means responsive to the phase and potential between the mid point of said secondaries and said slider to adjust said slider for network balance, the relative phase displacements of the potentials of said secondaries varying with core displacement, and a condenser shunting at least a portion of said potentiometer and adjusted to add an out of phase component to the ratio of voltage drops across the two sections of the potentiometer which substantially matches the out of phase component in the ratio of voltage outputs of the secondaries.

5. The network of claim 4 in which the means responsive to phase and potential is separated from the secondary mid point and the slider by a low-pass filter arranged to exclude harmonics of the frequency energizing the said primary.

6. A balanceable electric network including: first means establishing a first output potential of determinable phase and magnitude including, a primary winding for connection to a source of alternating current of constant magnitude, two pairs of secondary windings, the windings of each pair being substantially symmetrically disposed in respect to the primary, the windings of a first pair being connected to produce a single voltage output representative of the algebraic summation of the voltages of the first pair of secondary windings, and a core movable to adjust the linkages electromagnetically between the primary and the secondary windings; a second means establishing a second output potential of determinable phase and magnitude; means for bringing the core of the first means under control of a variable; means controlled by the difference in phase and magnitude between the first and second potentials for adjusting the means establishing the second potential toward balance of the two potential magnitudes; an impedance shunt across one of the second pair of secondary windings for adjusting the magnitude of an out-of-phase component of the voltage of one of the first pair of secondary windings to reduce it to substantially the value of the out-of-phase component of the voltage of the other of the first pair of secondary windings; and means directly associated with and for shifting the phase of one of the output potentials for equalization with the other output potential phase throughout their range of balanced magnitudes.

7. An electromagnetic motion responsive device as one of two elements of a balanceable network, said device including a primary winding for connection to a source of alternating current of constant magnitude, two pairs of secondary windings, the windings of each pair being substantially symmetrically disposed in respect to the primary, the windings of the first pair being connected to produce a voltage output representative of the algebraic summation of the voltages of the first pair of secondary windings, a core movable to adjust the linkages electromagnetically between the primary and the secondary windings, and an impedance shunt across the one of the second pair of secondary windings which adjusts the magnitude of an out-of-phase component of the voltage of one of the first pair of secondary windings to reduce it to substantially the value of the out-of-phase component of the voltage of the other of the first pair of secondary windings.

References Cited in the file of this patent

UNITED STATES PATENTS

| | | |
|---|---|---|
| 1,953,519 | Tritschler | April 3, 1934 |
| 2,414,102 | Hull et al. | Jan. 14, 1947 |
| 2,420,539 | Hornfeck | May 13, 1947 |
| 2,439,891 | Hornfeck | Apr. 20, 1948 |
| 2,440,984 | Summers | May 4, 1948 |
| 2,507,763 | Caine | May 16, 1950 |

OTHER REFERENCES

"Electronics," April 1947, p. 106.

"Electrical Measurements," by Laws, McGraw-Hill Book Co., pp. 603, 605.